[11] 3,581,280

| [72] | Inventor | John M. Holeman |
| | | Schenectady, N.Y. |
| [21] | Appl. No. | 560,418 |
| [22] | Filed | June 27, 1966 |
| [45] | Patented | May 25, 1971 |
| [73] | Assignee | General Electric Company |

[54] HOLOGRAPHIC SPATIAL FILTERS AND METHOD OF MAKING SAME
9 Claims, 4 Drawing Figs.

[52] U.S. Cl. .................................................. 340/146.3F,
350/3.5, 350/162
[51] Int. Cl. ................................................ G06k 9/00
[50] Field of Search ........................................ 340/146.3;
350/162, 3.5, 162 SF

[56] References Cited
UNITED STATES PATENTS

| 2,982,176 | 5/1961 | Kay ................................ | 88/24 |
| 3,305,834 | 2/1967 | Cooper et al. ................ | 340/146.3 |
| 3,398,269 | 8/1968 | Williams ........................ | 340/146.3 |
| 3,435,244 | 3/1969 | Burckhardt et al. .......... | 250/219 |
| 3,436,216 | 4/1969 | Urbach .......................... | 96/1.1 |

OTHER REFERENCES

Brochure of - Fiftieth Anniversary Meeting Program of the Optical Society of America, March 15, 1966 Pg. 7

C. J. Calus, "Plastic Deformation", Photographic Science and Engineering Vol. 7, 1963, pages 12— 13

A. Vander Lugt, "Signal Detection by Complex Spatial Filtering", IEEE Transactions on Information Theory, April 1964, pg. 139— 145

*Primary Examiner*—Maynard R. Wilbur
*Assistant Examiner*—Charles D. Miller
*Attorneys*—Richard R. Brainard, Marvin Snyder, Paul A. Frank, Frank L. Neuhauser, Melvin M. Goldenberg and Oscar B. Waddell

ABSTRACT: This invention relates to holography, and more particularly to a method and apparatus for rapidly making highly efficient spatial filters for holography.

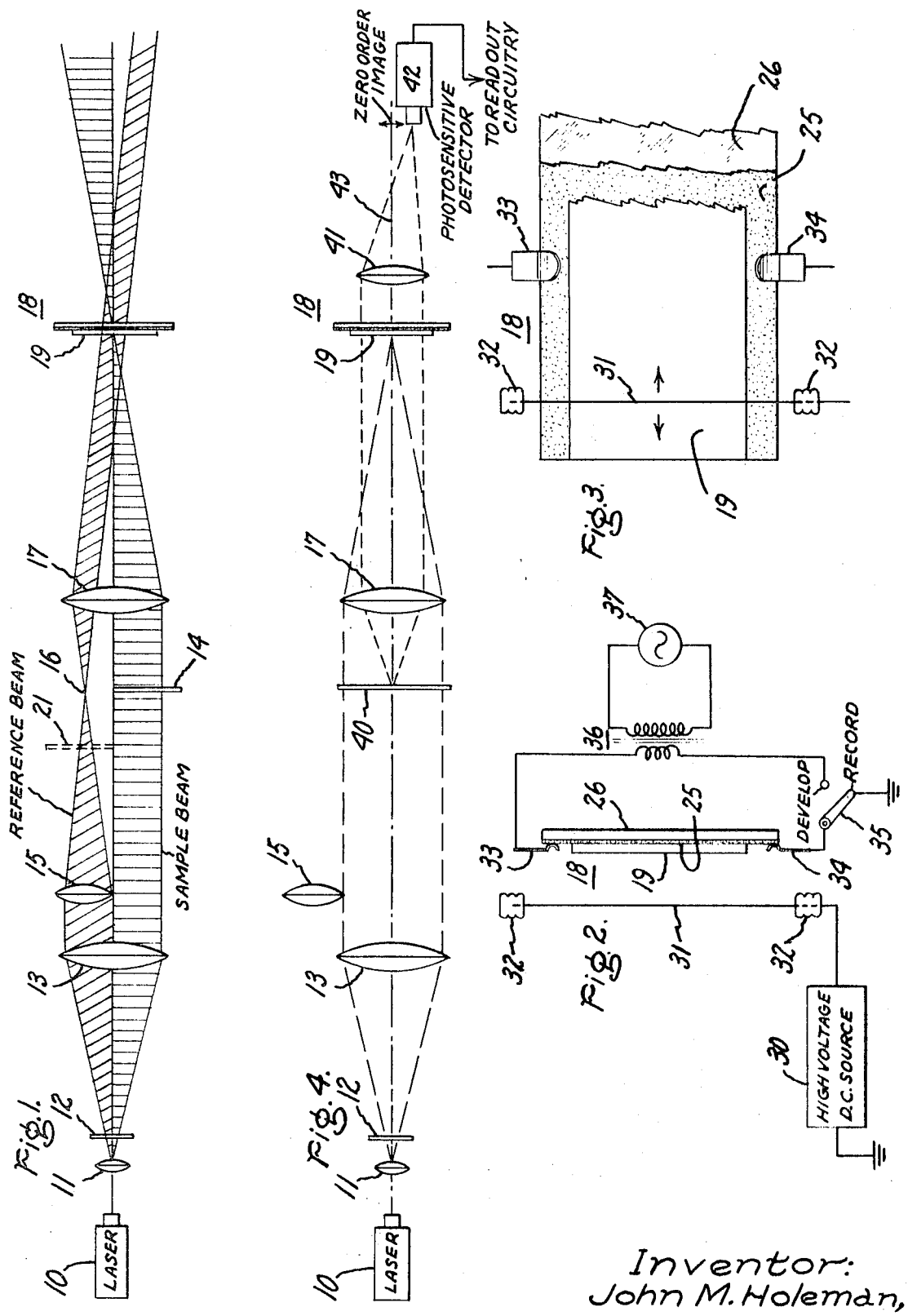

HOLOGRAPHIC SPATIAL FILTERS AND METHOD OF MAKING SAME

A holographic recognition process and system is described and claimed in C. Q. Lemmond and J. N. Holeman application, Ser. No. 492,187, filed Oct. 1, 1965, and assigned to the instant assignee. As therein described, the holographic recognition process involves making a recognition filter or hologram of an object by the interference of two beams of coherent monochromatic light, one of which beams is diffracted by the object. The complex image formed by the filter contains both phase and amplitude information regarding the object. This information has heretofore been recorded photographically on silver-bearing photographic emulsion. After processing, this hologram or spatial filter may be used to recognize the same object in a larger body of information. The apparatus shown and described in the aforementioned Lemmond, et al. application permits both phase and amplitude information to be recorded as light wave amplitudes, or variations in density in the photographic material. Such filter is termed a "complex amplitude-modulating filter".

There are several optical procedures for storing, retrieving, searching, recognizing or enhancing certain aspects of the information contained in an image. Many of these techniques, such as that described in the aforementioned Lemmond, et al. application, involve production of the intermediate diffraction image or hologram. This enables reconstruction at a later time to form the desired final image, if desired. Heretofore, the holograms have been made on silver-bearing photographic emulsions, since it was generally believed that the important feature of these holograms was the black silver image. An image of this nature is known as an "amplitude" image because the various silver densities modulate the amplitude of light transmitted through various areas. A typical explanation of the manufacture of such holograms and the theory of their reconstruction based on the silver image are contained in *Wavefront Reconstruction with Continuous-tone Objects* by E. Leith and J. Upatnieks in the Journal of the Optical Society of America, Dec. 1963, pages 1377—1381 (Volume 53).

The present invention concerns holograms in which the amplitude image is omitted and a method of making such holograms. This is made possible by my discovery of the fact that the amplitude image, as appears in silver-bearing holograms, is unnecessary for reconstructing the image of the object if the material of the hologram contains a sufficient amount of relief. Incidental relief effects in the gelatin produce a phase retardation of the light, resulting in image reconstruction. Thus, I have found it possible to remove the silver or amplitude image from a hologram comprising a silver-bearing photographic emulsion containing a sufficient amount of relief, without destroying the phase image, and to successfully reconstruct the image of the object from the resulting completely transparent phase hologram.

By utilizing a completely transparent phase hologram, a more efficient hologram may be produced; that is, the reconstructed image is of greater intensity than when produced from an amplitude image. This apparently is due to the fact that there is less attenuation of light amplitude introduced by a transparent hologram than by one having darkened areas. In the case of multiple-object filters, or filters for recognizing more than one object, this fact can be very important, since multiple holograms, or holograms which have been exposed to a number of objects in succession, produce relatively dim final images when the hologram is recorded as an amplitude image. This occurs, for example, when the hologram comprises a silver-bearing photographic emulsion, since impingement of light on the emulsion results in darkening thereof when the emulsion is developed.

Although photographic processes inherently involve modulation of light amplitude by the recorded image, there exists a class of deformable recording media which are completely transparent, thereby having no capability for modulating light amplitude. These media include those known as thermoplastic recording films, such as shown and described in W. E. Glenn, Jr., Pat. No. 3,113,179, issued Dec. 3, 1963; photoplastic recording films, such as shown and described in J. Gaynor Pat. application, Ser. No. 79,260, filed Dec. 29, 1960; and fluid films such as shown and described in J. F. Klebe Pat. No. 3,125,637, issued Mar. 17, 1964; all of which are assigned to the instant assignee. Light, however, is phase modulated by these transparent media as a result of the varying thickness thereof. This enables recording of both phase and amplitude information as phase modulation only. Spatial filters produced in this manner may be designated "complex phase-modulating filters". Since the spatial filter in such cases is completely transparent (neglecting surface reflection losses), the total light in each image transmitted by the filter is essentially equal to the incident light.

A two-beam spatial filter, as used in a recognition system, produces a recognition image that is offset from the optical axis or zero order image. The ratio of the light in this offset image, compared to the light incident on the filter, is termed the modulation efficiency of the filter. This is the chief factor in determining the intensity of the recognition image. The modulation efficiency of an amplitude filter, based on reasonable assumptions, is limited to about 16 percent. The efficiency of a phase-modulating filter comprising a deformable medium, however, can be over 40 percent. Therefore, the brightness of the recognition or output images, and in general the light efficiency of the system in which the filter is utilized, can be two to three times higher with a phase filter than with an amplitude filter.

In addition to its greater modulation efficiency, the phase modulating filter can be developed in a much shorter time than the amplitude modulating filter produced by photographic processes. Thus, in applications where the input image is continually changing, requiring a new spatial filter for comparison purposes, the spatial filter can be produced automatically in a much shorter period of time by use of a deformable recording medium than by use of a silver photographic emulsion. Moreover, in object recognition systems, the filter can be made in the exact location where it is to be used, thus avoiding the critical and exacting step of positioning the filter for utilization.

Accordingly, one object of the invention is to provide a method of rapidly producing complex holographic spatial filters.

Another object is to provide a method of producing a complex holographic spatial filter wherein amplitude and phase information regarding the recorded image is contained in the form of phase modulation only.

Another object is to provide a complex holographic spatial filter of high modulation efficiency.

Another object is to provide a wholly transparent holographic spatial filter.

Another object is to provide an object recognition system wherein the image contained in a holographic spatial filter may be rapidly changed without any repositioning of the filter within the system.

Briefly, in accordance with a preferred embodiment of the invention, there is provided for use in an object recognition system including a source of substantially coherent light, means for illuminating objects to be recognized with the source of light, light sensing means, and a holographic spatial filter positioned so that light emanating from the objects impinges on the filter, an improved holographic spatial filter comprising a transparent deformable medium containing a pattern of deformations defining the object to be recognized.

In accordance with another preferred embodiment of the invention, there is provided a method of making an improved spatial filter comprising the steps of generating first and second beams of coherent light, directing the first beam onto an optical image of an object desired to be recognized so as to modulate the first beam with image information, directing the second beam and the modulated first beam in directions to interfere with each other and impinge on an electrostatically charged, photoconductive, thermoplastic medium to produce a residual charge pattern thereon, and thereafter heating the medium to a temperature sufficiently high to soften the medium and allow the medium to deform in accordance with the residual charge pattern thereon.

The features of the invention believed to be novel are set forth with particularity in the appended claims. The invention itself, however, both as to organization and method of operation, together with further objects and advantages thereof may best be understood by reference to the following description taken in conjunction with the accompanying drawings in which:

FIG. 1 is a schematic diagram illustrating the process of making a transparent holographic spatial filter;

FIG. 2 is a schematic diagram illustrating apparatus for preparing the spatial filter to record and thereafter develop an image;

FIG. 3 is a schematic diagram illustrating the method of applying a uniform electrostatic charge to the spatial filter, with the spatial filter shown broken away to illustrate the layers thereof; and FIG. 4 is a schematic diagram illustrating use of a transparent holographic spatial filter in an object recognition system.

FIG. 1 is a schematic diagram of the optical portion of a system for fabricating holographic spatial filters wherein both amplitude and phase information regarding the recorded image is contained in the form of phase modulation only. This optical system generally comprises a point source of monochromatic light 10 preferably originating from a gas laser of conventional type, such as a commercially available helium-neon gas laser. The laser produces a collimated beam of coherent light which is diverged through a lens 11 and, when passed through a shutter 12, impinges on a collimating lens 13.

Lens 13 directs a portion of the beam impinging thereon, referred to as the sample beam, onto an input plane 14. A second part of the collimated beam of coherent light emanating from lens 13 is directed through a lens 15 to thereby establish a reference beam. Transparency 14 and the focus 16 of the reference beam from lens 15 should be in the same plane normal to the direction of transmission of the collimated beam.

The record of the process, which becomes a holographic spatial filter indicated generally at 18, is made at the focus of a lens 17. Thus, a light sensitive, deformable, transparent recording medium in the form of a layer 19 on which the spatial filter image is to be recorded, is situated at the focal point of lens 17. This location is also known as the frequency or filter plane. The image on input plane or transparency 14 may be any graphic recording whatsoever.

In order to produce a spatial filter, it is necessary that layer 19 be electrostatically charged prior to impingement of light thereon. Once a charge has been applied uniformly on layer 19, shutter 12 is opened, and light transmitted through input plane transparency 14 is directed through lens 17 which focuses the sample beam onto layer 19 of spatial filter 18. In addition to the sample beam, the reference beam of coherent light projected through lens 15 is also directed by leans 17 onto recording medium 19. Because transparency 14 may introduce more than negligible attenuation of the sample beam, the reference beam may be passed through an optical attenuator 21, shown dotted, such as an Eastman Kodak neutral density filter, sold by Eastman Kodak Company of Rochester, New York. In the alternative, a polarizing film, which can be rotated in relation to the natural polarization of the reference beam generated by the laser, may be employed as attenuator 21 in order to effect the desired degree of optical attenuation.

Lens 17 causes interference of light diffracted by transparency 14 with coherent light from the reference beam in such manner that both amplitude and phase of the diffracted light are recorded on spatial filter 18. Layer 19 is selectively discharged in accordance with the pattern of light falling thereon. In this manner, a latent image in the form of an electrostatic charge pattern is recorded on layer 19. By subsequently applying heat to the spatial filter which is thermoplastic or heat-softenable, the material of the layer 19 is allowed to flow and deform in accordance with the charge pattern thereon, in order to develop the latent image. Upon subsequent cooling to room temperature, the material of layer 19 hardens to the extent that deformations therein are retained independent of the charge pattern, so that the spatial filter is ready for use in an object recognition system.

The spatial filter produced in the foregoing manner may be utilized until it is desired to establish a new spatial filter image in the system. At that time, the spatial filter is erased by heating deformable medium 19 for sufficient time to raise the temperature above that used for development of the latent image, and subsequently cooling the deformable medium. The high temperature renders deformable medium 19 conductive as well as liquid, resulting in a discharge of any remaining charges and a leveling of the surface of the deformable medium due to the absence of electrical charge across the entire surface. The resulting level surface facilitates accurate recording of a new spatial filter image thereon.

FIG. 2 illustrates apparatus for preparing the spatial filter to record an image, as well as to develop the recorded image. Spatial filter 18 comprises a photoconductive, transparent thermoplastic 19 overlying an electrically conductive transparent inner layer 25 and a transparent dielectric support layer 26. As described in J. Gaynor application, Ser. No. 79,260, filed Dec. 29, 1960 now Pat. No. 3,291,601, granted Dec. 13, 1966 and assigned to the instant assignee, deformable photoconductive film 19 of spatial filter 18 may comprise a film-forming solid which is itself photoconductive, or which, by addition of photoconductive materials thereto, can be rendered substantially photoconductive. The photoconductive materials are electrical insulators when in the dark, but become partially electrically conductive when illuminated. The response of these photoconductors to light is reversible in that the materials again become insulating when illumination ceases. The class of useful photoconductive materials includes thermoplastic photoconductive polymers, mixtures of inorganic photoconductive solids with thermoplastic nonphotoconductive polymers, and mixtures of organic photoconductive compounds with thermoplastic nonphotoconductive polymers. Suitable thermoplastic photoconductive polymers include ring substituted aromatic polymers with substituents selected from the group consisting of halogen, amine, sulphur-oxide and nitrogen-oxide radicals such as substituted diphenyl polymers and the like. The inorganic photoconductive materials which can be added to a thermoplastic polymer in order to render the entire mixture substantially photoconductive, can be selected from the class of elemental compounds such as selenium and sulphur, phosphors, and even solid solutions of mixed crystals. Suitable organic dyes include crystal violet, malachite green, basic fuchsin, trypaflavine methylene blue, pinacyanole, kryptocyanine, neocyanine, and certain proteins. The photoconductors for admixture with the organic polymers are semiconductors which may be further characterized as being photoconductive under ordinary conditions, chemically unreactive in such manner as not to lose photoconductivity in the mixture and having a dark resistivity of at least $10^{11}$ ohm-centimeters. The thermoplastic organic polymers, suitable either as the photoconductive medium itself or as an element in a mixture with a photoconductor, can be characterized by a substantially infinite room temperature viscosity and a relatively fluid viscosity temperature of 100°—150° C, together with a relatively high electrical resistivity. In addition, the preferred thermoplastic organic polymers are transparent to visible radiation for optical readout in a manner described infra. Selection of a particular thermoplastic or organic polymer for admixture with a photoconductor is not critical to the recording medium, since suitable polymers include acetals, acrylics, polyesters, silicones, and vinyl resins having the above described properties. Mixtures of thermoplastic organic polymers may be employed to satisfy all of the above requirements. One such satisfactory mixture is a blend of polystyrene, m-terphenyl, and the copolymer of 95 wt. percent of butadiene with 5 wt. percent of styrene in the ratios of 70 percent polystyrene, 28 percent m-terphenyl, and 2 percent of the copolymer. Thickness of the deformable photoconductive medium may vary from about 0.1 mils to several mils, with a preferred thickness being about equal to the minimum distance between deformations to be stored on the film.

Electrically conductive inner layer element 25 serves both as a conductor for selectively discharging the uniformly charged deformable photoconductive film 19 and as a heating element for deforming the selectively discharged photoconductive film. A suitable electrically conductive film having a square surface geometry displays a resistance of approximately 10 ohms between opposite edges of the surface, is adherent to both the deformable photoconductive film and the dielectric support layer, and is thermally and chemically stable at temperatures of 100°—150 ° C employed to allow deformation of the photoconductive film. The electrically conductive film is optically transparent to permit readout of stored information with minimal attenuation of light passed therethrough. Suitable materials for the electrically conductive film include the metals, such as iron, tin, chromium, and nickel; the metallic oxides, such as stannic oxide and cuprous oxide; and the metallic salts, such as cuprous iodide. For optical transparency, it is generally required that the thickness of film 25 be no greater than approximately 1 mil.

Dielectric support layer 26 may comprise glass or, in the alternative, a resinous material which is nonplastic at temperatures up to at least 150° C and which possesses the well-known dielectric properties of electrically insulating materials. The preferred resinous materials for the dielectric support layer are optically transparent and may be selected from the general class of film-forming organic polymers including polyesters, epoxy resins, and polycarbonates. Moreover, certain film base materials such as those sold by E. I. DuPont de Nemours Company under the trademarks "Mylar" and "Cronar" have also been successfully employed. A preferred thickness of the dielectric support layer is approximately one-eighth inch for glass, or 4 mils for a resinous material.

Prior to recording an image on photoconductive material 19, the spatial filter, which must be uniformly charged in order to accept the applied image without distortion, may be charged in place from a high voltage DC source 30 connected to a corona-forming wire 31 which is supported at either end by insulators 32 and located close to the photoconductive material in a plane parallel thereto. A pair of spring clips 33 and 34 make contact with conductive inner layer 25. Clip 35 is connected to a two-position switch 35. A first position of switch 35, labeled RECORD, connects spring clip 34 to ground. A second position of switch 35, designated DEVELOP, is connected through the secondary winding of a transformer 36 to spring clip 33. The primary winding of transformer 36 is connected to an alternating current source, such as a 60 cycle AC source 37. For a spatial filter comprising a 2-inch square slide, so that conductive inner layer 25 is 2-inches square, the secondary winding of transformer 36 is preferably adjusted to supply power of 480 watts thereto.

The requisite uniform electrostatic charge may be established on photoconductive medium 19 by high voltage DC source 30 when selector switch 35 is in the RECORD position so as to ground conductive layer 25. The voltage applied to corona wire 31 is preferably in the order of 1100 volts, in order to produce a voltage gradient between wire 31 and photoconductive medium 19 of sufficient amplitude to effectuate a corona discharge. The unipolar ions of the corona discharge are accelerated toward grounded conductive layer 25, and therefore strike photoconductive layer 19. This establishes a unipolar charge on the surface of layer 19. A typical charge potential gradient thus established would be 33 volts per micron of thickness of layer 19.

To deposit a uniformly distributed electrostatic charge across the entire surface of photoconductive layer 19 requires that wire 31, typically 10 mils in diameter, extend completely thereacross in a plane parallel thereto. Wire 31 is typically situated in a conventional charging head (not shown) at a distance of 1 inch from layer 19. FIG. 3, wherein like numerals indicate like elements, illustrates the action of wire 31 in being passed across the entire surface of photoconductive layer 19. The wire is moved at a uniform speed so as to assure uniform charges deposition. The arrows on either side of wire 31 serve to indicate that wire 31 may be moved in either direction during the charge deposition process.

After photoconductive layer 19 is uniformly charged, high voltage DC source 28 is turned off. Shutter 12, shown in FIG. 1, is then opened for but a sufficient interval to impart a latent image to layer 19 of spatial filter 18. If desired, the laser and shutter arrangement of FIG. 1 may be replaced by an electronically pulsed laser wherein pulse width controls this interval. Typical exposure time for red laser light ranges from 5-—20 seconds.

During the recording process, light falling on photoconductive medium 19 selectively renders the medium conductive in accordance with the pattern resulting from light modulated by transparency 14 interfering with the reference beam, as shown in FIG. 1. Since conductivity of any portion of medium 19 varies with the intensity of light striking that portion, charge on photoconductive film 19 selectively leaks off to ground in accordance with the impinging light image, leaving a charge pattern on medium 19 corresponding to the impinging light image. While the high voltage source is turned off, the charge lost by layer 19 is unreplenished. When light from laser 10 no longer falls on medium 19, the resistance of the entire medium again increases to a high value, substantially halting all further leakage of charge therefrom.

A photoconductive deformable medium 19 comprising, for example, an equipart mixture of anthracine with low molecular weight polystyrene, exhibits a dark resistivity of approximately $10^{15}$ ohm-centimeters. When this medium is illuminated, however, resistivity of the mixture drops sufficiently to permit conduction of the electrostatic charge to ground in accordance with the illumination pattern. The ease with which the deposited charge at any point on the surface of deformable photoconductive medium 19 proceeds through this material to ground is determined by the intensity of light impinging at that point. Hence, a charge pattern is produced on the surface of deformable photoconductive medium 19 having a point-for-point corresponding with light intensity variations of the impinging image.

Once the electrostatic charge on photoconductive layer 19 has been selectively modulated by an impinging light image, and the source of light has been extinguished, the residual electrostatic charge pattern may be formed into a deformation image by heating medium 19 to a temperature sufficiently high to allow the medium to deform under the action of the residual electrostatic charges. This is accomplished by moving selector switch 35 to the DEVELOP position, thereby connecting conductive medium 25 across the secondary winding of transformer 36. Resistive heating of conductive layer 25 ensues, due to establishment of circulating currents within medium 25. For a 2-inch square slide, a suitable duration of secondary winding output power sufficient to very quickly heat conductive layer 25 to a temperature which causes photoconductive thermoplastic medium 19 to soften and become a relatively viscous, nonelastically deformable liquid, may be approximately seven-sixtieths seconds. Under these conditions, the forces of electrostatic attraction due to voltages between layer 25 and the surface of medium 19 causes medium 19 to deform in accordance with its residual electrostatic charge pattern. This pattern of deformation, which represents a hologram of the image in transparency 14 of FIG. 1, may be retained indefinitely by restoring switch 35 to the RECORD position, thereby opening the heating circuit for conductive film 25 to allow the conductive film, and consequently photoconductive medium 19, to cool. Medium 19 thus hardens, preserving its pattern of deformation.

By moving corona wire 31 across the surface of photoconductive layer 19, a uniform electrostatic charge may be established on the spatial filter without ever moving the spatial filter itself. Thus, the difficult problem of precisely positioning the holographic spatial filter within an object recognition system, which is especially acute due to the fact that the photoconductive thermoplastic spatial filter of the instant invention is completely transparent, is readily overcome. Furthermore, this spatial filter is reuseable, since the image thereon may be eliminated merely by heating deformable medium 19 to the level at which the medium becomes conductive. For a two inch square slide, a suitable heating interval to accomplish erasure is twenty-one sixtieths seconds. Because this procedure entirely discharges medium 19, no extrinsic deformation forces are present. Moreover, because the rise in temperature exceeds that used for developing medium 19, the medium is converted to a liquid state of sufficiently low viscosity that the surface thereof tends to level out. The ensuing smooth, flat surface on photoconductive medium 19 may then be preserved by cooling the medium. Thereafter, a new holographic image may be imparted to spatial filter 18.

FIG. 4 illustrates the system of FIG. 1 as used in its object recognition mode, wherein like numerals indicate like elements. In this mode of operation, lens 15 is positioned outside the beam of coherent light originating from laser 10, and the object 40, to be recognized, is substituted for the input image situated between lenses 13 and 17 when the system was used in the filter making mode, illustrated in FIG. 1. In addition, an imaging lens 41 is moved into position behind spatial filter 18 which directs a first order output image, displaced from the optic axis 43 of the recognition system, onto the image plane of a photosensitive detector 42. The zero order output image, which is situated on the optic axis 43 of the recognition system, merely comprises an image of the entire object 40, and is not utilized.

In the recognition mode of operation, light from laser 10 is diverged through lens 11 and passed through shutter 12, which may be either be opened momentarily or maintained open for much longer intervals. Coherent light from shutter 12 is passed through collimating lens 13 which directs the light onto object 40. Light emanating from object 40 is focused by lens 17 onto photoconductive medium 19 of spatial filter 18. In addition, light transmitted by spatial filter 18 is focused by lens 41 onto the image plane of photosensitive detector 42. In this fashion, which is described in greater detail in the aforementioned Lemmond, et al. applications, Ser. No. 492,187, and in J. E. Bigelow and C. Q. Lemmond application, Ser. No. 560,419 filed concurrently herewith and assigned to the instant assignee, the position of each recognition spot which comprises the first order output image and which is formed on the input plane of photosensitive detector 42, may be utilized for determining both identity and position of a graphic image or symbol on input plane 40. The location of the spot on the input plane of photosensitive detector 42 may be determined by electronic readout apparatus (not shown) similar in nature to that shown and described in the aforementioned Bigelow, et al. application.

The more intense output images obtainable from spatial filters comprising deformable media are explainable, at least in part, by the fact that the deformations which make up an image in a deformable medium have two sloped sides; that is, since images are impressed in the deformable medium by electrostatically forming depressions therein, each depression requires at least two sides. Thus, each side of the depression produces a separate diffraction effect, and these effects reinforce each other to produce intense diffraction patterns of the image impressed in the deformable medium. These intense diffraction patterns comprise the output image. On the other hand, images formed on silver-bearing photograph emulsion comprise a synthesis of dark and light regions and, at the interfaces of these regions, diffraction is produced only by the beam of light passing through the light sides of the interfaces. Light diffracted by an image formed on photographic emulsion, therefore, is diminished in energy to a greater extent than light diffracted by an identical image formed on a deformable medium.

The foregoing describes improved holographic spatial filters and a method of making these filters. The invention teaches a method of rapidly producing complex holographic spatial filters of high modulation efficiency, wherein both amplitude and phase information regarding the recorded image is contained in the form of phase modulation. The holographic spatial filter of the invention is entirely transparent and enables rapid changing of holograms in an object recognition system without any repositioning of the filter within the system.

While only certain preferred features of the invention have been shown by way of illustration, many modifications and changes will occur to those skilled in the art. It is therefore to be understood that the appended claims are intended to cover all such modifications and changes as fall within the true spirit and scope of the invention.

I claim:

1. In an object recognition system including a source of substantially coherent light, means for illuminating objects to be recognized with said source of light, light sensing means, and a holographic spatial filter positioned so that light emanating from said objects impinges on said filter, the improvement wherein said hologram recorded on a photoconductive transparent thermoplastic medium of substantially uniform transmissivity as a pattern of deformations defining the object to be recognized.

2. The apparatus of claim 1 wherein said spatial filter is positioned between said source of substantially coherent light and said light sensing means.

3. The apparatus of claim 1 and further including means for applying an electrostatic charge to said medium prior to impinging light thereon and means for heating said medium after impinging said light thereon.

4. The apparatus of claim 3 wherein said spatial filter is positioned between said source of substantially coherent light and said light sensing means.

5. The method of making an improved holographic spatial filter comprising the steps of: generating first and second beams of coherent light; directing the first of said beams onto an optical image of an object desired to be recognized so as to modulate said first beam with image information; directing said second beam and said modulated first beam in directions to interfere with each other and impinge on an electrostatically charged, photoconductive, thermoplastic medium to produce a residual charge pattern thereon; and heating said medium to a temperature sufficiently high to soften said medium and allow said medium to deform in accordance with the residual charge pattern thereon and recorded as a pattern of deformations a phase hologram of the object to be recognized.

6. The method of making an improved holographic spatial filter of claim 5 wherein said step of directing the first of said beams onto an optical image of an object desired to be recognized comprises the step of passing the first of said beams through a transparency containing an image of said object so as to modulate said first beam with image information.

7. The method of making an improved holographic spatial filter comprising the steps of: uniformly electrostatically charging a transparent, photoconductive, thermoplastic medium; generating first and second beams of coherent light; directing the first of said beams onto an optical image of an object desired to be recognized so as to modulate said first beam with image information; directing said second beam and said modulated first beam in directions to interfere with each other and impinge on said medium so as to selectively electrostatically discharge said medium according to a pattern determined by said optical image of an object desired to be recognized; and heating said medium to a temperature sufficiently high to allow said medium to deform in accordance with said pattern and record a phase hologram of said object.

8. The method of making an improved holographic spatial filter of claim 7 wherein said step of directing the first of said beams onto an optical image of an object desired to be recognized comprises the step of passing the first of said beams through a transparency containing an image of said object so as to modulate said first beam with image information.

9. The method of reusing a photoconductive thermoplastic, holographic spatial filter in a holographic recognition system by substituting a new image thereon while said filter is maintained stationary in said system, said method comprising the steps of: heating said filter to a first temperature sufficiently high to soften the surface material thereon and render said surface material conductive; cooling said filter in order to reharden said surface material; uniformly electrostatically charging the surface of said filter; generating first and second beams of coherent light; directing the first of said beams onto an optical image of an object desired to be recognized so as to modulate said first beam with image information; directing said second beam and said modulated first beam in directions to interfere with each other and impinge on the surface of said filter so as to selectively electrically discharge said surface according to a predetermined pattern; and reheating said filter to a second temperature below said first temperature but sufficiently high to soften the surface material thereon and allow said material to deform in accordance with said predetermined pattern, all of said steps being carried out without removing said spatial filter from its operative location in the holographic recognition system.